United States Patent [19]

Thomas

[11] Patent Number: 5,061,127

[45] Date of Patent: Oct. 29, 1991

[54] DRILL BIT WITH CONCAVE SPURS AND HAVING TRIANGULAR CENTER POINT WITH VEE GROOVES

[76] Inventor: Robert E. Thomas, 1100 Driftwood Dr., Lincoln, Nebr. 68510

[21] Appl. No.: 681,337

[22] Filed: Apr. 5, 1991

[51] Int. Cl.[5] .................... B23B 51/04

[52] U.S. Cl. .................... 408/212; 408/213; 408/225

[58] Field of Search .................... 408/211-213, 408/199, 214, 223-225; D15/139

[56] References Cited

U.S. PATENT DOCUMENTS

| | | | |
|---|---|---|---|
| 124,089 | 2/1872 | Shepardson | 408/212 |
| 2,543,206 | 2/1951 | Smith | 408/224 |
| 2,627,292 | 3/1953 | Kronwall | 408/213 |
| 2,689,131 | 9/1954 | Priest | 408/211 |
| 2,782,824 | 2/1957 | Robinson | 408/223 |
| 2,794,468 | 6/1957 | Huxtable | 408/211 |
| 3,477,481 | 11/1969 | Czerniewicz | 144/144 R |
| 3,543,820 | 12/1970 | Tulumello | 144/219 |
| 3,920,350 | 11/1975 | Southall | 408/211 |
| 3,997,279 | 12/1976 | Porter | 408/211 |
| 4,286,904 | 9/1981 | Porter et al. | 408/225 |
| 4,480,951 | 11/1984 | Regensburger | 408/213 X |
| 4,878,786 | 11/1989 | Hedgepeth | 408/211 X |
| 4,950,111 | 8/1990 | Thomas | 408/212 |

*Primary Examiner*—Steven C. Bishop

[57] ABSTRACT

An improved drill bit for wood boring or boring in other relatively soft material, having a generally cylindrical shaft (20), with a flattened blade portion at one end (24). The blade portion (24) is broad and flat with essentially parallel side surfaces (41, 42) and having negatively beveled edges along the length of such side surfaces, such side surfaces giving way to a modified end edge. The modified end edge includes a center point, with a length of one half to several times the thickness of the blade, and said point (34) is centered on the end edge and is made with a triangular shape with a vee groove from the center of the base to the middle of the vertex. (35). Outer spurs of rectangular cross section (29 and 30) with a concave tip and a negative bevel away from the leading edge are located on the lateral extremities of the end edge. Radially extending cutting surfaces (45 and 46) with a negative bevel away from the leading edge (37 and 38) extend at right angles from the base of the center point to the inside edge of the outer spurs.

1 Claim, 2 Drawing Sheets

DRILL BIT WITH CONCAVE SPURS AND HAVING TRIANGULAR CENTER POINT WITH VEE GROOVES

BACKGROUND-FIELD OF INVENTION

This invention relates to flat or spade type drill bits, specifically to a drill bit having an improved more versatile cutting surface with unique center point and concave tipped spurs for drilling into a non-metallic material such as wood, or other relatively soft material, and used in a hand held powered drill, a manual powered brace or drill press.

BACKGROUND-DISSCUSION OF PRIOR ART

Heretofore, flat or spade type bits emphasized several kinds of points including triangular shaped, diamond shaped and rectangular-triangular shaped center points of rather large size and associated radially extending cutting surfaces. The center point has been given various configurations from a flat to a fluted side surface and straight to beveled edges. The radially extending cutting surfaces are beveled and align at varying angles to the cutting surface. The relatively large center point is employed as a guide and reportedly to improve cutting action and to reduce the magnitude of required torque and thrust. The prior art when used in a hand held powered drill results in a lack of concentric holes when boring into relatively thin materials, since the guidance control diminishes as the large point exits the hole. Splintering at the entrance and exit portion of the hole can also be a problem. The typical spade bit is not useful in drilling overlapping holes, nor in drilling holes that enter the workpiece at such an angle that the center point cannot be engaged first. The typical spade bit is not suitable for drilling essentially flat bottomed holes. These things are some of the problems experienced with the prior art that have been addressed in a unique way by the present invention. The present invention employes a unique center point of a triangular shape, with a vee groove extending along each face, such vee groove being centered on the face of the point and running from the middle of the base to the center of the vertex.

The present invention includes a spur or tooth of rectangular cross section with a concave cutting surface located on the ends of the radially extending cutting surfaces. The spur on the ends performs as an additional guide and improves the concentricity of the hole and reduces splintering at the exit portion of the hole, particularily in thinner work pieces. The concave cutting surface of the outer spurs of the current invention improve cutting action since each spur serves to cut an arched track, separate small chips, and provides improved conditions for action of the radially extended cutting surfaces. When used in a drill press or a device for holding a portable power unit in rigid alignment, the concave spurs on the bit provide guidance to enable the boring of overlapping holes and the spurs also provide guidance in boring holes that enter the work piece at an angle that precludes engaging the center point first. The spurs also make it possible to drill an essentially flat bottomed hole since with the outer spurs present the center point be shortened. The rectangular cross section and concave cutting surface of the outer spurs as opposed to a blade only or scoring type configuration spur, improves cutting efficiency and reduces heat buildup during high speed drilling.

OBJECTS AND ADVANTAGES

Accordingly several objects and advantages of my invention over prior patents are: to provide a drill bit that will drill concentric holes in relatively thin material, that will reduce splintering at the entrance and exit portion of the hole, that will improve cutting efficiency, that will drill overlapping holes, that will drill holes that enter the workpiece at any angle, that will drill holes with an essentially flat bottom, that will produce a disc which stops cutting action when a backing surface is used, and that will operate with less friction. The prior art lacks precision in boring holes in and through relatively thin material, is subject to being improved in relative cutting efficiency, is not effective in boring holes that enter the work piece at angles, is not useful in the boring of essentially flat bottom holes or mortises, will not stop cutting action when a backing surface is used, and is subject to greater friction.

Further objects and advantages of my invention will become apparent from the consideration of the drawings and the ensuing description of it.

DESCRIPTION OF THE PREFERRED EMBODIMENTS

Figure 1:
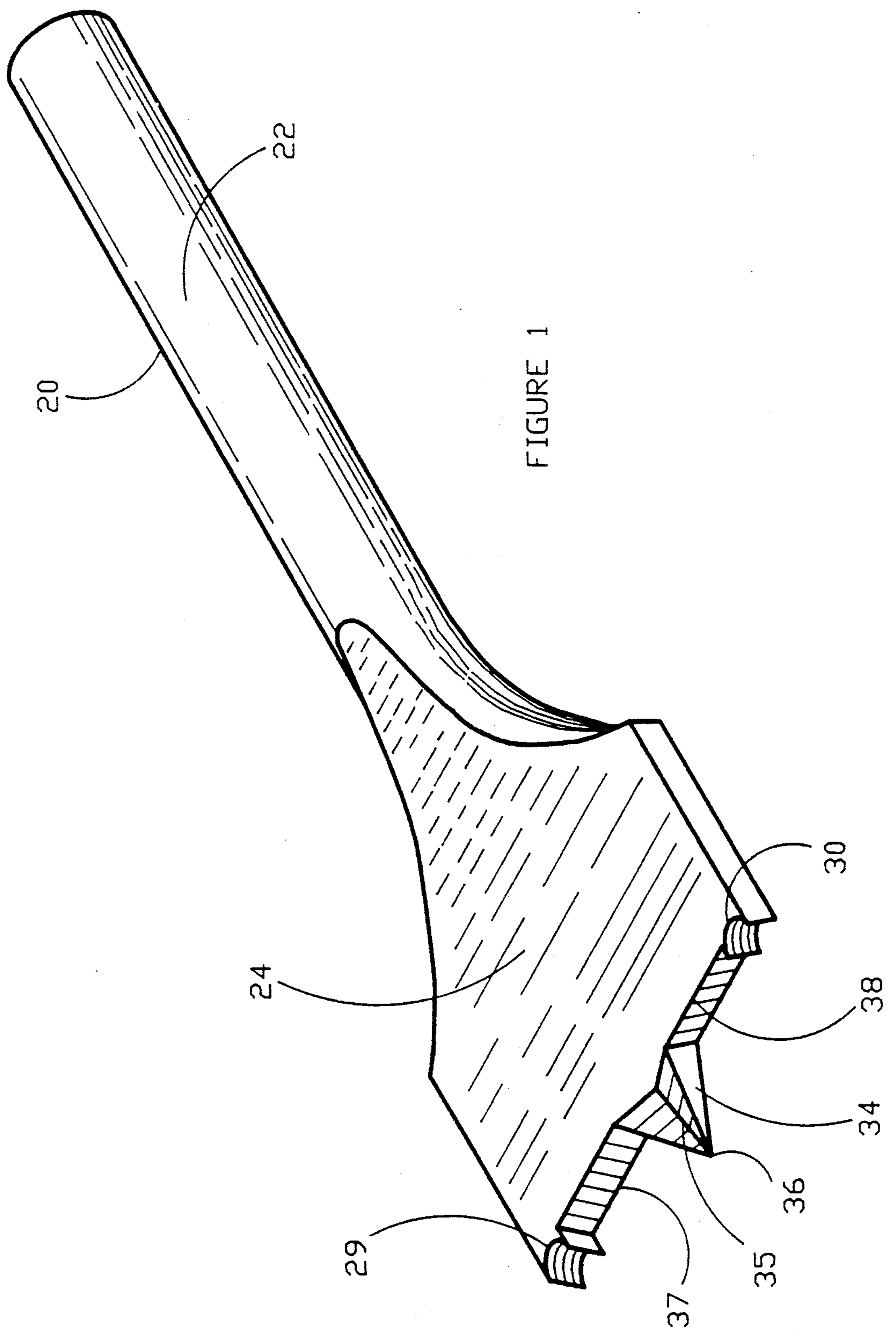
FIG. 1 is an isometric view of a drill bit with construction in accordance with the form of the present invention.

The drill bit 20 has several main portions, namely a shaft 22, a flattened blade portion 24, a triangular shaped center point 34 with vee grooved faces 35, and vertex 36, radially extended cutting surfaces 37 and 38, and concave tipped outer spurs 29 and 30 (FIG. 1).

In the preferred form thereof the drill bit is formed as an integral member, while the shaft portion of the drill bit 22 is of generally cylindrical configuration, the other end of the shaft 22 is flattened into the portion known as the blade 24 (FIG. 1).

Figure 3:
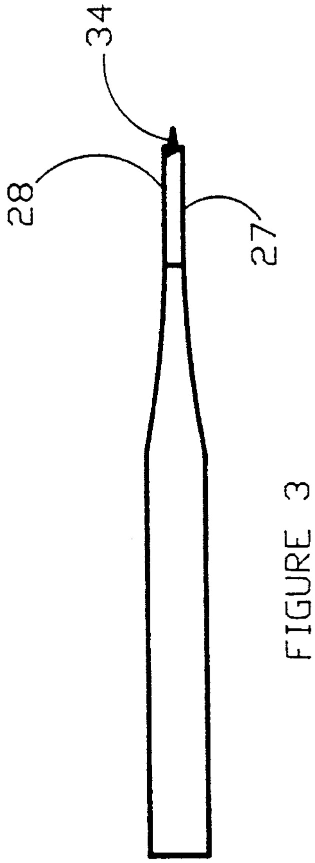
FIG. 3 is a side elevation view of a drill bit with construction in accordance with the form of the present invention.

The flattened blade portion 24 has essentially parallel side faces 27 and 28 (FIG. 3).

The beveled edges 41 and 42 (FIGS. 2 and 4) are parallel to the axis of the shaft.

The end edge of the blade terminates in a center point 34 of triangular shape with vee grooved faces 35 and having a length of one half to several times the thickness of the blade, and which is centered on the end edge, (FIGS. 1, 2, 3 and 4).

Figure 2:
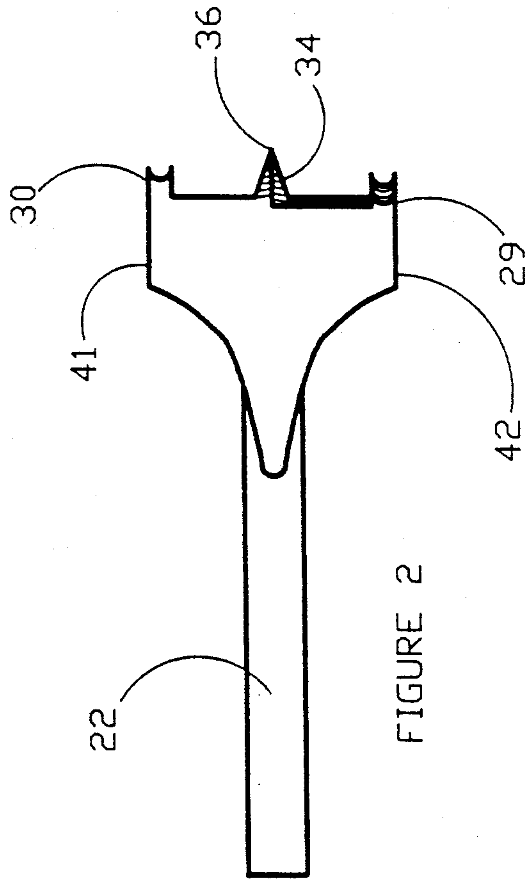
FIG. 2 is a top plan view of a drill bit with construction in accordance with the form of the present invention.

Said point 34 maintains the thickness of the blade near the base with vee shaped grooves 35 running from the base of the point to the center of the vertex 36 and is parallel to the axis of the shaft 22 (FIGS. 1 and 2).

The leading edges of the radially extending cutting surfaces 37 and 38 (FIG. 4) extend laterally along the end edge of the blade 24 from the base of the center point 34, to the inside edge of the outer spurs 29 and 30.

Figure 4:
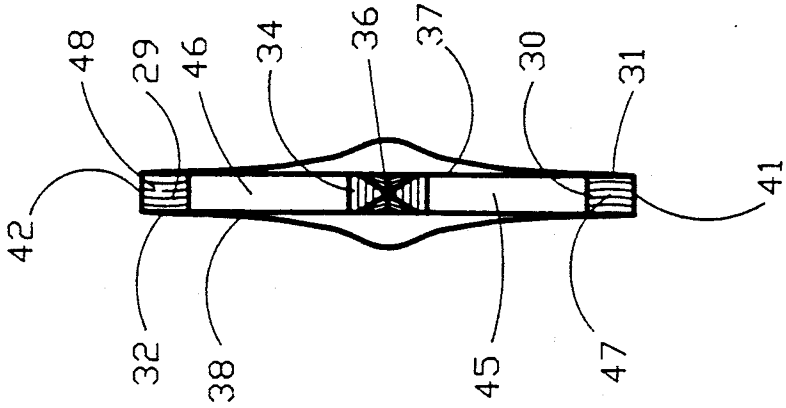
FIG. 4 is a front view of a drill bit with construction in accordance with the form of the present invention.

The radially extending cutting surfaces 45 and 46 are beveled negatively away from the leading edges 37 and 38 (FIG. 4).

The cutting surfaces are fixed at an approximate right angle to the central axis of the center point 34 and to the outer spurs 29 and 30 (FIGS. 1, 2 and 4).

The outer concave tipped spurs are located on the outer end of the end edge of the side faces 27 and 28, and are bounded on the outer limit by the beveled parallel edges of the side faces 41 and 42 of the flattened blade portion (FIGS. 2 and 4).

The spurs with concave tips 29 and 30 (FIGS. 1, 2 and 4) approximate the thickness of the blade in width and one half to several times the thickness of the blade in length.

The end surface of the spurs 47 and 48 (FIG. 4), are concave and beveled in a negative aspect in relation the leading edges of the spurs 31 and 32.

OPERATION OF INVENTION

The use of this invention for boring holes of various configurations such as through holes, overlapping holes for preparing mortises, half holes, and holes at any angle in wood or other relatively soft material, requires a hand powered brace or power tool to provide torque with the operator providing the necessary thrust. Essentially flat bottom holes for use in mortising or for other reasons can be made by using an embodiment of the bit with a shortened center point. The drill bit shank is placed in the chuck of a hand held brace, a hand held power drill or a drill press for use. When using a hand held brace or a hand held power drill a starter mark for the center point is preferred. When using the drill bit in a drill press the spinning drill bit is lowered slowly onto the workpiece, with the center point and spurs contacting the workpiece first, and as the center point and spurs cut separate small chips a guidance track is formed, and as the radially extended cutting surfaces enter the workpiece ribbon like chips are cut by these surfaces and the desired hole is formed.

CONCLUSION AND SCOPE OF INVENTION

The reader will see that the novel drill bit of the invention provides a more versatile form of the spade type bit while retaining the economical and relatively simple and uncomplicated characteristics. The reader will also see the potential for ease of sharpening and general maintainence of the bit. While my above description of the invention contains many specific features, these should not be construed as limitations to the scope of the invention and embodiments, but rather as an exemplification of the preferred embodiment thereof.

I claim:

1. A drill bit for wood or other relatively soft material, comprising:
   - a generally cylindrical shaft;
   - a flattened blade portion at one end of said shaft, said blade portion including
   - broad, flat, and essentially parallel side faces;
   - side edges, each of said side edges having a leading edge with the side edge negatively beveled with respect to said leading edge along the length of said side edge;
   - an end edge, said end edge including
   - two side spurs, each of said side spurs being rectangular in cross section and located on lateral extremities of said end edge, said side spurs comprising narrow extensions of said side edges and having a length equal to about one half to several times the thickness of said blade portion, each of said side spurs having an end face with a concave shaped leading terminal edge, said end face negatively beveled with respect to said leading concave terminal edge;
   - a center point centered on said end edge, said center point being triangular in shape having a vee groove centered on the sides from the base to the center of the tip, said center point negatively beveled with respect to said leading edge, said center point having a length of about half to several times the thickness of said blade portion; and
   - end surfaces extending radially between said center point and said spurs, each of said end surfaces having a leading cutting edge, said end surfaces being negatively beveled with respect to said leading cutting edges.

* * * * *